United States Patent [19]
Ward

[11] Patent Number: 5,392,225
[45] Date of Patent: Feb. 21, 1995

[54] METHOD AND APPARATUS FOR CORRELATING TARGET DATA

[75] Inventor: Anne Marie D. Ward, Greenville, Tex.

[73] Assignee: E-Sytems, Inc., Dallas, Tex.

[21] Appl. No.: 963,550

[22] Filed: Oct. 20, 1992

[51] Int. Cl.$^6$ .............................................. G01S 5/06
[52] U.S. Cl. ...................................... 364/516; 364/514
[58] Field of Search ............... 342/119, 125, 145, 189, 342/378; 364/516, 514

[56] References Cited

U.S. PATENT DOCUMENTS

| | | |
|---|---|---|
| 3,936,826 | 2/1976 | Hoffman . |
| 4,488,249 | 12/1984 | Baker ................................. 364/516 |
| 4,549,211 | 10/1985 | Assael et al. ....................... 364/516 |
| 4,570,225 | 2/1986 | Lundy ................................. 364/516 |
| 4,633,261 | 12/1986 | Kosaka et al. . |
| 4,860,216 | 8/1989 | Linsenmayer . |
| 5,005,147 | 4/1991 | Krishen et al. . |
| 5,047,776 | 9/1991 | Baller . |
| 5,062,056 | 10/1991 | Lo et al. ............................. 364/516 |
| 5,107,271 | 4/1992 | White ................................. 342/189 |

Primary Examiner—Emanuel T. Voeltz
Assistant Examiner—Thomas Peeso
Attorney, Agent, or Firm—Harold E. Meier

[57] ABSTRACT

A method and apparatus for correlating target data obtained from a first sensor for a subject target with target data obtained from a second sensor for a candidate target. The target data includes both target location and target classification dimensions. Target location data is processed to derive a missed distance Figure of merit indicative of a match in location between the subject target and candidate target. Target classification data is processed to derive a categorical Figure of merit indicative of the likelihood that a target having the classification of the subject target and a target having the classification of the candidate target would be co-located. The missed distance Figure of merit and the categorical Figure of merit are mathematically combined to output a measure of correlation related to the likelihood that the subject target and the candidate target are the same target.

23 Claims, 3 Drawing Sheets

METHOD AND APPARATUS FOR CORRELATING TARGET DATA

TECHNICAL FIELD

The present invention relates to data correlation and, in particular, to the correlation of target data generated for multiple targets by a plurality of target sensors.

BACKGROUND OF THE INVENTION

The correlation of target data generated by a plurality of sensors allows for a more accurate estimation of a detected target than is typically possible from evaluating the target data generated by a single sensor. Target data correlation systems have been used to accurately detect and evaluate one or more targets sensed by multiple target sensors. For example, U.S. Pat. No. 4,633,261, issued to Kosaka, et al., discloses a system for correlating the tracking data generated by a plurality of radar sensors to determine whether the radar systems are tracking the same or multiple targets. U.S. Pat. No. 5,005,147, issued to Krishen, et al., discloses an integrated sensor system wherein data generated by an optical sensor and an electromagnetic sensor are correlated to reconstruct the surface shape of the sensed target.

SUMMARY OF THE INVENTION

The present invention comprises a method and apparatus for correlating target data generated by a first sensor for a subject target with target data obtained from a second dissimilar sensor for one or more candidate targets to determine whether any of the detected targets are the same target. Target data is output by the sensors for each detected target in several corresponding data dimensions, where the "dimension" of data refers to some specific, measurable target characteristic. In accordance with the broader aspects of the invention, a Figure of merit ("FOM") relating to the accuracy of a match between the output target data for the subject and candidate targets is derived by a data processor in each corresponding data dimension. The Figures of merit derived from comparing the subject and candidate targets are then mathematically combined by the processor to generate a measure of correlation ("MOC") indicative of the likelihood that the detected subject target and the detected candidate target are the same target.

In particular, the target data from the first and second sensors includes a first data dimension comprising corresponding target location data (e.g., longitude and latitude). A second data dimension comprising corresponding target classification data (e.g., optical target category and electromagnetic target emitter type) is also output from the first and second sensors. A "missed distance" Figure of merit that is indicative of a match in the location of the subject and candidate targets is derived by normalizing the measured distance between the targets. A "categorical" Figure of merit that is indicative of a match in the classification of the subject and candidate targets is derived by evaluating the likelihood of co-location between targets having the sensed classification data. The Figures of merit are mathematically combined to output a measure of correlation related to the likelihood that the first type target and the second type target are the same target. Comparison of the output measure of correlation value to a predetermined threshold identifies whether the candidate target may be fused with the subject target.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE DRAWINGS

Figure 1A:
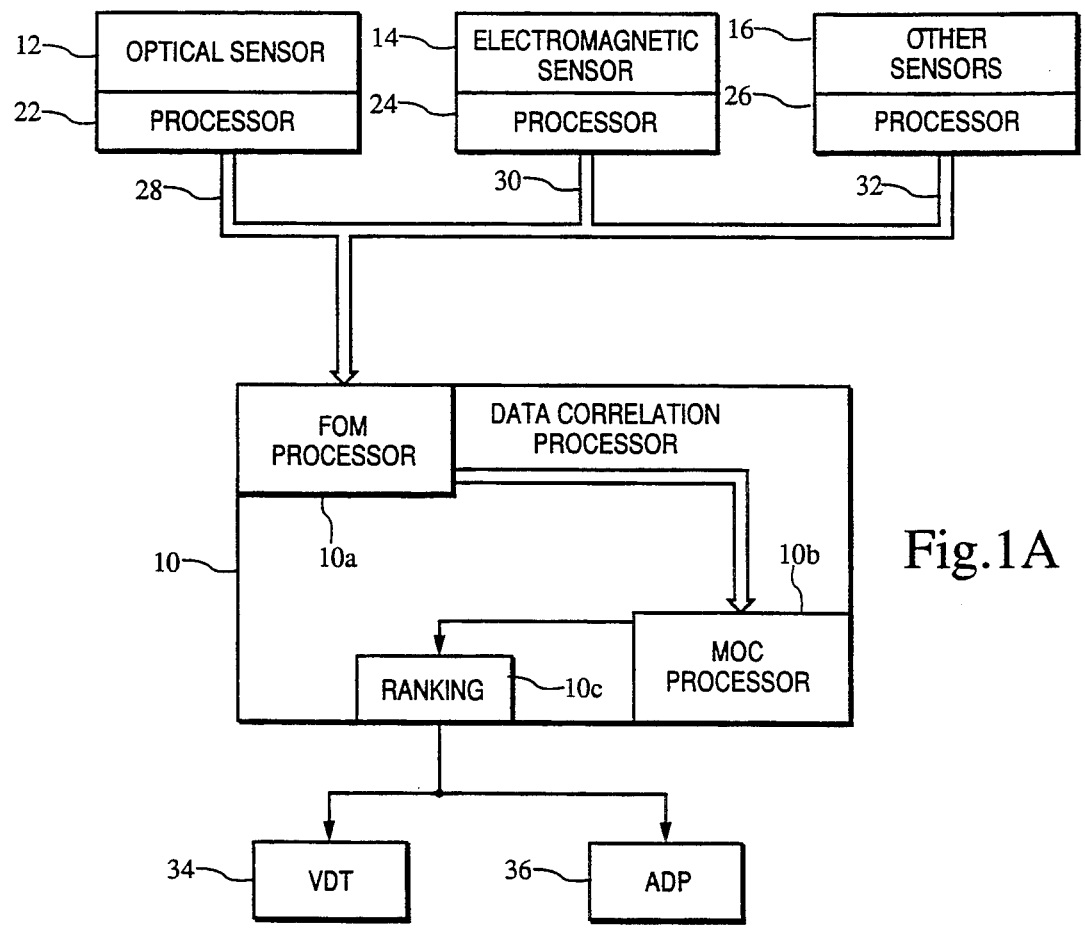
FIG. 1A is a block diagram illustrating the implementation of the sensor data correlation system of the present invention in a dissimilar target sensor application.

Referring now to FIG. 1A, there is shown a block diagram of the sensor data correlation processor 10 of the present invention for processing sensor data from an optical sensor 12 and an electromagnetic sensor 14. The optical sensor 12 is preferably an IMINT (or imagery intelligence) sensor, and the electromagnetic sensor 14 is preferably an ELINT (or electronic intelligence) sensor. It will, of course, be understood that the data correlation processor 10 of the present invention may be configured to process sensor data output from other sensors 16 including, without limitation, an additional IMINT or ELINT type sensor or other sensor as required.

Figure 1B:
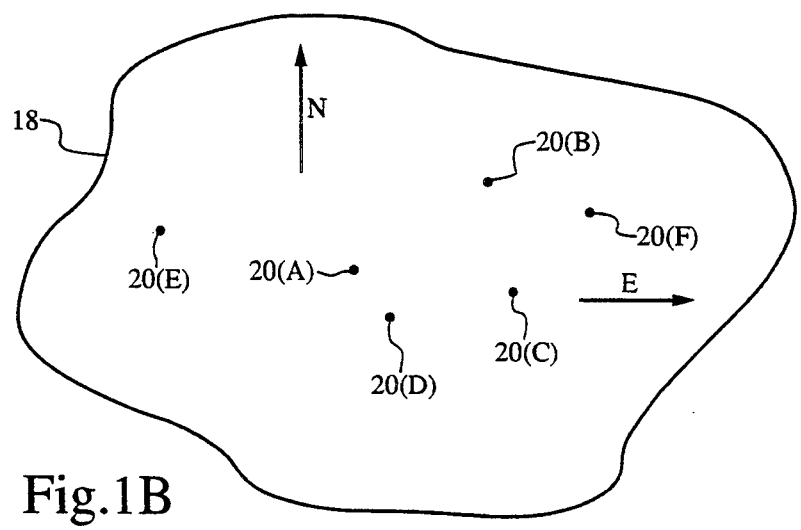
FIG. 1B illustrates the placement of targets detected within the environment sensed by the sensors of FIG. 1A.

Referring now to FIGS. 1A and 1B, within a predetermined environment 18 sensed by the optical sensor 12, electromagnetic sensor 14 and any included other sensors 16, several targets 20 of different types have been detected. For example, the electromagnetic sensor 14 has detected emitter type targets 20(A), 20(E) and 20(F) from their electromagnetic emissions, and the optical sensor 12 has detected optical type targets 20(B), 20(C) and 20(D) from their optical images. Connected to each of the sensors 12, 14, and 16 is a corresponding processor 22, 24 and 26 for processing the sensor outputs to generate target data for each target 20 in at least one, and preferably a plurality of, data dimensions for output on a corresponding data bus 28, 30 and 32 to the correlation processor 10.

The use of the term "dimension" refers to a specific, measurable characteristic of the sensed target identifiable from the generated target data. For example, one target characteristic identifiable from the target data output by both the optical sensor 12 and electromagnetic sensor 14 comprises target location data (e.g., longitude and latitude of each target 20). With the optical sensor 12, one additional identifiable target characteristic obtainable from the target data comprises a classification of the target 20 according to its sensor recognized optical category (e.g., airfield, bridge, missile system). With the electromagnetic sensor 14, one additional identifiable target characteristic obtainable from the target data comprises a classification of the target 20 according to its sensor recognized emitter type (e.g., airfield tracking radar, missile system tracking radar). It will be understood that other target data dimensions are obtainable from optical, electromagnetic and other sensor types, and that the foregoing list of dimensions is illustrative only. The processors 24 and 26 for the electromagnetic sensor 14 and certain other types of similar sensors 16 also output error ellipse data for processing in conjunction with the target data.

Different dimensions of data are known to correspond with each other in recognizable ways. For example, target location data obtained from an optical sensor 12, electromagnetic sensor 14 and any other sensors 16 correspond to each other in terms of-the detected target longitude and latitude. Furthermore, target classification data obtained from an optical sensor 12 (optical category) and electromagnetic sensor 14 (emitter type) are said to correspond in that certain types of emitter targets are known to be associated, or not associated as the case may be, with certain types of optical targets. This correspondence in data dimensions between the target data obtained by different, and in this case, dissimilar sensors, is advantageously used by the correlation processor 10 to determine whether any of the targets 20(A), 20(E) or 20(F) detected by the electromagnetic sensor 14 are the same target as any of the targets 20(B), 20(C) or 20(D) detected by the optical sensor 12.

The sensor data correlation processor 10 of the present invention receives the various dimensions of target data from the sensor processors 22, 24 and 26 via the corresponding data buses 28, 30 and 32. The processor 10 further receives error ellipse data output from the sensor processors 24 and 26 and transmitted over the corresponding data buses 30 and 32. This target and error ellipse data is processed to determine whether the dimensions of target data for a given subject target correlate with the corresponding dimensions of target data for any one of several candidate targets. If such a correlation is found by the data correlation processor 10, then the subject target and candidate target are said to be the same target and become proper targets for fusion.

Figure 5:
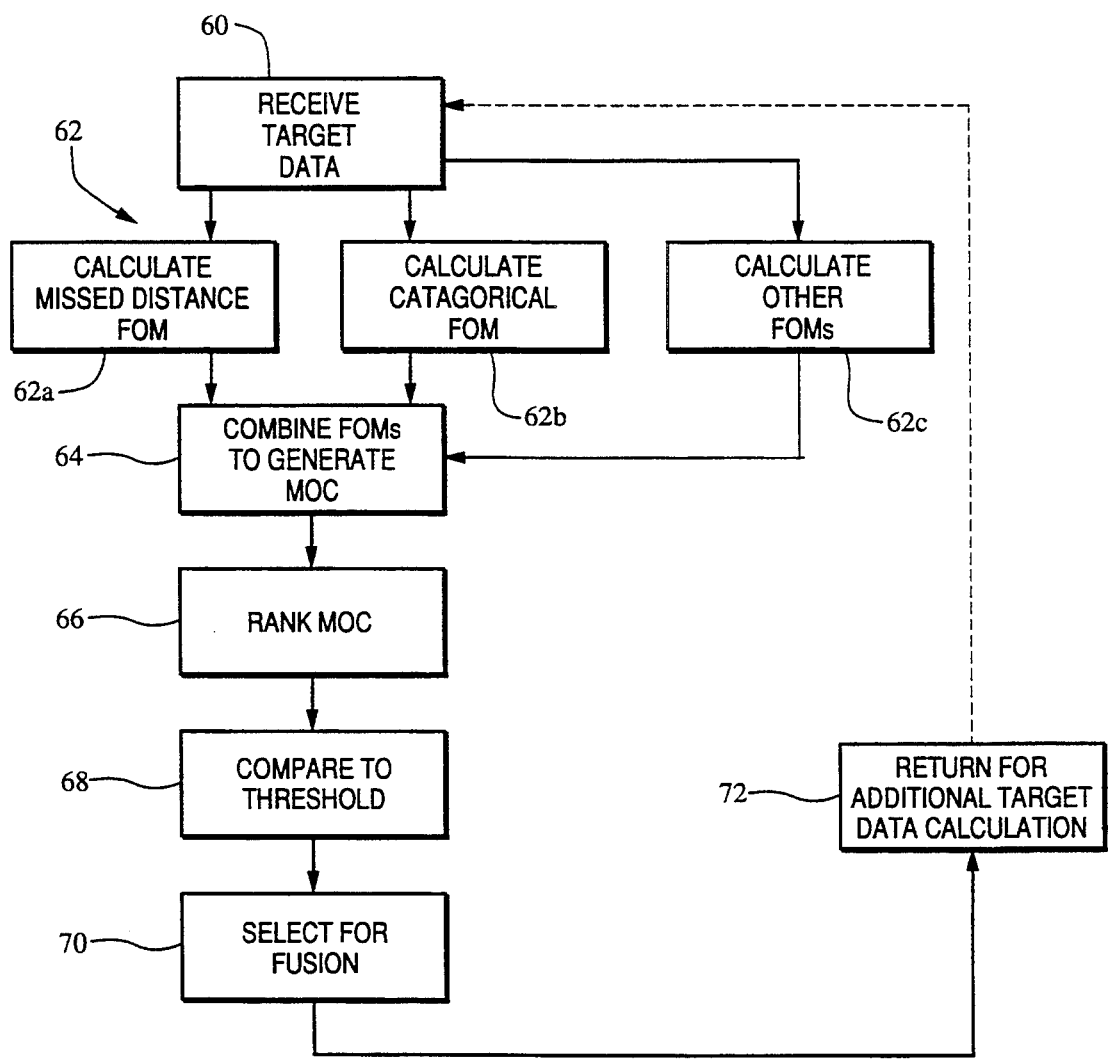
FIG. 5 is a flow diagram illustrating the target data correlation process.

The correlation processor 10 includes a Figure of merit ("FOM") processor 10a for receiving the plurality of dimensions of target data and error ellipse data (step 60, FIG. 5) and generating a Figure of merit value related to the accuracy of a match between the target data of a subject target and a candidate target in each of the corresponding data dimensions (step 62, FIG. 5). A measure of correlation ("MOC") processor 10b is further included in the correlation processor 10 for mathematically combining each of the Figure of merit values output by the FOM processor 10a for a given subject and candidate targets to generate a measure of correlation value related to the overall accuracy of a match between the target data of the subject and candidate target across all processed data dimensions (step 64, FIG. 5). The correlation processor 10 further includes means for ranking 10c the output measure of correlation values (step 66, FIG. 5). Once ranked, the measure of correlation values are compared to a threshold value (step 68, FIG. 5) by an operator using either a video display terminal ("VDT") 34 or automated data processor ("ADP") 36 to identify those targets that are proper candidates for fusion with the subject target (step 70, FIG. 5).

Figure 2:
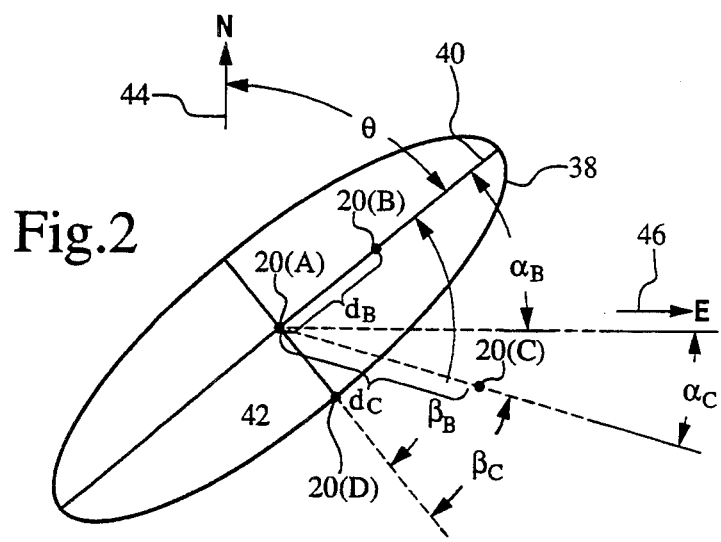
FIG. 2 illustrates the placement of an error ellipse with respect to a selected subject target in the environment containing a plurality of candidate targets shown in FIG. 1B.
Figure 3:
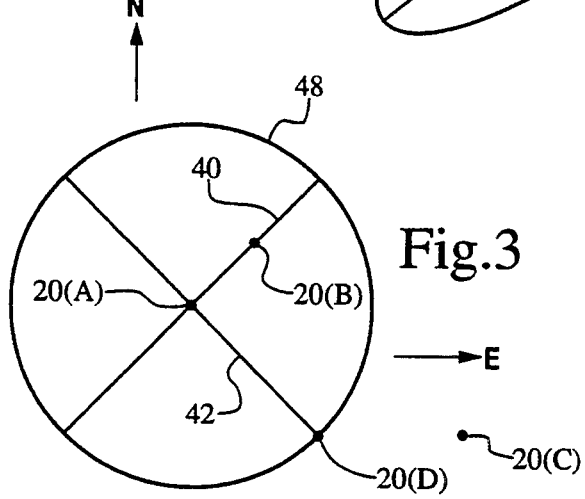
FIG. 3 illustrates the normalization of the shape of the error ellipse by the calculation of a missed distance Figure of merit according to the present invention.

A more complete understanding of the operation of the sensor data correlation processor 10 may be had by specific reference to FIGS. 2 and 3 for the processing of the target location and classification data dimensions described above, along with the output error ellipse data. It will, of course, be understood that other known dimensions of target data generated by sensors may be processed in accordance with the method and apparatus of the present invention. For purposes of the following description only, the "subject target" is assumed to be a selected one of the targets 20(A), 20(E) or 20(F) detected by the electromagnetic sensor 14 and the "candidate target" is assumed to be a selected one of the targets 20(B), 20(C) or 20(D) detected by the optical sensor 12.

For each target detected by either the optical sensor 12 or electromagnetic sensor 14, the corresponding processors 22 and 24 output one corresponding dimension of target data each comprising the target location in terms of longitude and latitude. The FOM processor 10a processes the target longitude and latitude data to generate a first Figure of merit value related to the "missed distance" between the subject target and the candidate target (step 62a). The value of the missed distance Figure of merit ("FOM$_{mdi}$") is a function of the measured distance ("d$_i$") between the subject target and a selected i$^{th}$ candidate target, and is obtained according to the following equation:

$$d_i = \sqrt{(lat_t - lat_i)^2 + (lon_t - lon_i)^2 \cos^2(lat_t)}$$

wherein:
lon$_t$ = subject target longitude;
lon$_i$ = i$^{th}$ candidate target longitude;
lat$_t$ = subject target latitude;
lat$_i$ = i$^{th}$ candidate target latitude; and
the cos(lat$_t$) term accounts for the nonparallel lines of longitude.

The missed distance Figure of merit FOM$_{mdi}$ calculation includes the physical relationship between an error ellipse 38, shown in FIG. 2, and the position of each of the detected targets 20. The error ellipse 38 is positioned about a selected subject target (in this case, target 20(A)) and is defined by the following error ellipse data that is output by the processor 24 of the electromagnetic sensor 14 and input into the correlation processor 10 via data bus 30:

s-maj = semi-major axis 40 of the ellipse 38;
s-min = semi-minor axis 42 of the ellipse 38; and
Θ = orientation angle to the semi-major axis 40 measured clockwise from the north-south axis 44. It will, of course, be understood that the error ellipse may have a circular shape when s-maj is equal to s-min.

Candidate target 20(B) is positioned half-way along the semi-major axis 40 between the center and edge of the ellipse 38. Candidate target 20(C) is outside the ellipse 38. Candidate target 20(D) is closer to the subject target 20(A) than target 20(B) and is positioned on the semi-minor axis 42. The positioning of one target on each of the axes 40 and 42 of the ellipse 38 is by way of example only to facilitate an understanding of the manner with which the Figure of merit determination affects the location relationship between the targets 20.

One other angle ($\alpha_i$) necessary for the missed distance calculation must be calculated according to the following equation:

$$\alpha_i = atan\left(\frac{(lat_t - lat_i)}{(lon_t - lon_i)\cos(lat_t)}\right)$$

where:
the $\cos(lat_t)$ term accounts for the non-parallel lines of longitude; and $\alpha_i$ is the angle from the east-west axis 46 to a line connecting the subject target at the center of the ellipse 38 to the $i^{th}$ candidate target under consideration.

From the foregoing equations, location target data and error ellipse data, the value of the missed distance Figure of merit $FOM_{mdi}$ may be determined according to the following equation:

$$FOM_{mdi} = d_i^2 \left(\frac{\sin^2(\beta_i)}{s - maj^2} + \frac{\cos^2(\beta_i)}{s - min^2}\right)$$

wherein:
$\beta_i = \Theta - \alpha_i$; and $\beta_i$ is the angle from the semi-minor axis 42 to a line connecting the subject target at the center of the ellipse 38 to the $i^{th}$ candidate target. The angles $\beta_B$ and $\alpha_B$ with respect to candidate target 20(B) and angles $\beta_C$ and $\alpha_C$ with respect to candidate target 20(C) are shown illustrated in FIG. 2.

Calculation of the missed distance Figure of merit $FOM_{mdi}$ results in a value related to the missed distance between the subject and candidate targets. The smaller the value of missed distance Figure of merit $FOM_{mdi}$, the better the match between the subject target and the candidate target for the target location data dimension. If the value of the missed distance Figure of merit $FOM_{mdi}$ is less than one, then the candidate target is positioned and located within the error ellipse of the subject target.

FIG. 3 illustrates the location geometry between the subject target 20(A) and each of the candidate targets 20(B, C and D) following the missed distance Figure of merit calculation. The error ellipse 38 has been transformed into a circle 48 by the missed distance Figure of merit calculation with the subject target 20(A) positioned at its center. Candidate target 20(B) is now the closest target to the subject target 20(A) and is positioned halfway between the center and edge of the circle 48 in the direction of the semi-major axis 40. Candidate target 20(C), positioned outside the ellipse, is also positioned outside the circle 48 following the missed distance calculation and has a Figure of merit value greater than one. Candidate target 20(D) is positioned at the edge of the circle 48 in the direction of the semi-minor axis 42. Thus, the missed distance Figure of merit calculation normalizes the locations of the candidate targets 20(B, C and D) with respect to the subject target 20(A) according to the defined error ellipse 38.

For each target 20 detected by either the optical sensor 12 or electromagnetic sensor 14, the corresponding processors output another corresponding dimension of target data comprising target classification data. An optical category determination is output for each candidate target by the processor for the optical sensor 12 and an electromagnetic emitter type determination is output for the subject target by the processor for the electromagnetic sensor 14. The FOM processor 10a processes the optical category and emitter type target classification data to generate a second Figure of merit value, called the categorical Figure of merit ("$FOM_{ci}$"), that is a function of the likelihood that a target of the detected emitter type and a target of the detected optical category would be co-located (step 62b). The quantitative value of this Figure of merit is indicative of the existence of the detection of the same, single target by both the optical and electromagnetic sensors, rather than detection of two different targets.

The categorical Figure of merit $FOM_{ci}$ is assigned a value of negative one ("−1") by the processor 10a for the received classification data when there is little to no likelihood of co-location between the detected emitter type for the subject target and the detected optical category for the candidate target. For example, a navigational radar electromagnetic emitter type and a river bridge optical category are inconsistent with each other in terms of location proximity because the radar and bridge are not likely to be co-located. Thus, the categorical Figure of merit $FOM_{ci}$ value of negative one indicates a likelihood that two separate targets are present. The categorical Figure of merit $FOM_{ci}$ is assigned a value of positive one ("1") by the processor 10a for the received classification data when there is a likelihood of co-location between the detected emitter type for the subject target and the detected optical category for the candidate target. For example, a navigational radar emitter type and an airfield optical category are consistent with each other in terms of location proximity and are likely to be co-located. Thus, the categorical Figure of merit $FOM_{ci}$ value of positive one indicates a likelihood that only one target is present. Finally, the categorical Figure of merit $FOM_{ci}$ is assigned a value of zero ("0") by the processor 10a for the received classification data when the emitter type and optical category are neither consistent nor inconsistent with each other. For example, a radar system for a surface-to-air missile launcher and a bridge could be co-located, but not necessarily so. Thus, the categorical Figure of merit $FOM_{ci}$ value of zero indicates that a co-location determination cannot be made on classification data alone.

For each comparison between a subject target and a candidate target, the MOC processor 10b mathematically processes the corresponding Figures of merit generated by the FOM processor 10a for the subject and candidate targets to generate a measure of correlation ("$MOC_i$") value according to the following equation:

$$MOC_i = (2 - FOM_{ci})FOM_{mdi}$$

One measure of correlation value $MOC_i$ will be derived between the subject target and each of the i candidate targets for output to the means for ranking 10c. The smaller the measure of correlation value, the more likely the subject target and the $i^{th}$ candidate target are the same target. By comparing the measure of correlation value $MOC_i$ to a threshold value, a determination is made regarding fusion of the subject and candidate targets. Furthermore, following calculation of measures of correlation for a first subject target, the process is repeated for other subject targets until all subject and candidate targets have been processed (step 72, FIG. 5).

Figure 4:
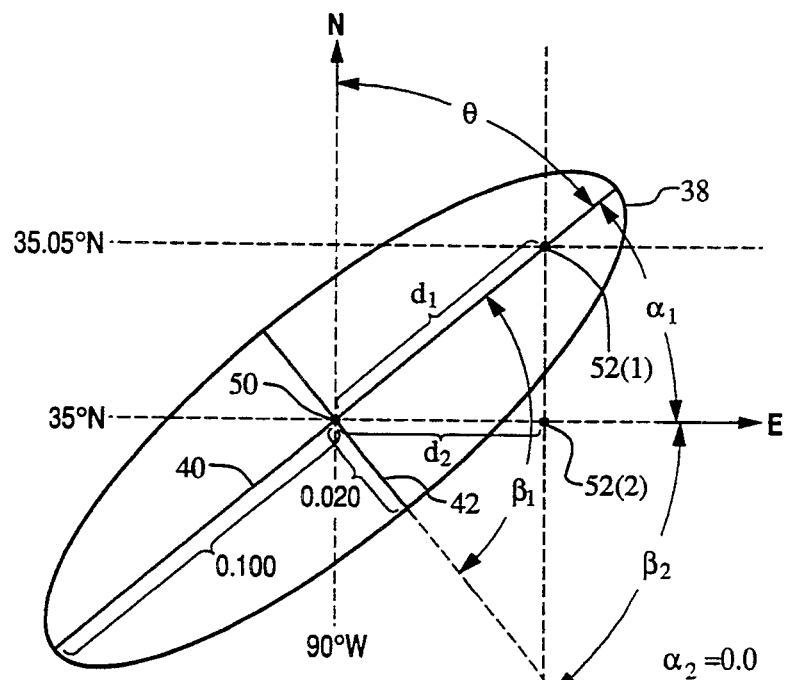
FIG. 4 illustrates a particular example correlating target location and classification data.

Referring now to FIG. 4, there is shown an illustration of a particular example correlating target location and classification data dimensions in accordance with the method and apparatus of the present invention. It will, of course, be understood that this example is by way of illustration and not limitation.

The subject target 50 detected by the electromagnetic (or ELINT) sensor 14 is a navigation radar having a location of 90.0° W longitude and 35.0° N latitude. The first candidate target 52(1) detected by the optical (or IMINT) sensor 12 is an airfield having a location of 89.95° W longitude and 35.05° N latitude. The second candidate target 52(2) detected by the optical sensor 12 is a bridge having a location of 89.95° W longitude and 35.0° N latitude. The error ellipse 38 output by the processor 24 for the subject target 50 has a semi-major axis 40 of length 0.100 oriented at $\Theta = 39.32°$ off the north-south axis 44 and a semi-minor axis 42 of length 0.020.

In accordance with the equations previously discussed, the calculation of the Figures of merit and measures of correlation from the target location and classification data proceeds as follows. The measured distance $d_i$ calculation results in:

$d_1 = 0.064634$ for target 50(1); and $d_2 = 0.040957$ for target 50(2);

indicating that in terms of measured distance the second target 52(2) is closer to the subject target 50 than the first target 52(1). The $\alpha_i$ angle calculation measuring the angle from the east-west axis 46 to the line connecting the subject target 50 to the candidate target 52(i) results in:

$\alpha_1 = -50.68°$ ; and $\alpha_2 = 0.0°$.

The missed distance Figure of merit $FOM_{mdi}$ calculation normalizes the error ellipse 38 shown in FIG. 4 to a circle resulting in:

$FOM_{md1} = 0.41776$; and $FOM_{md2} = 2.577$;

thus indicating that although the first target 52(1) is further away from the subject target 50 in terms of measured distance, the first target and subject target are more closely correlated than the subject target 50 and the second target 52(2) in terms of the missed distance Figure of merit. It should further be noted that because the first target 52(1) has a missed distance Figure of merit less than one, the first target is within the error ellipse 38. Conversely, the second target 52(2) has a missed distance Figure of merit greater than one indicating the target is outside the error ellipse 38.

Turning now to the categorical Figure of merit $FOM_{ci}$ determination, it will be remembered that the subject target 50 is a navigation radar, the first candidate target 52(1) is an airfield, and the second candidate target 52(2) is a bridge. There is a recognized likelihood of co-location between a navigational radar and an airfield for the first target 52(1). Thus, the categorical Figure of merit equals:

$FOM_{c1} = 1$.

Conversely, there is little to no recognized likelihood of co-location between a navigational radar and a bridge for the second target 52(2) resulting in a categorical Figure of merit equal to:

$FOM_{c2} = -1$.

Once the missed distance and categorical Figures of merit have been determined, they are mathematically combined in the manner previously described resulting in the following measure of correlation $MOC_i$ values:

$MOC_1 = 0.41776$; and $MOC_2 = 7.731$.

From the determined measures of correlation, it is clear that the first target 52(1) is a more likely candidate for fusion with the subject target 50 than the second target 52(2). In fact, the smaller the resulting measure of correlation, the more highly correlated the target data. By ranking and comparing a plurality of determined measures of correlation against a threshold value, all candidate targets with measures of correlation below the threshold may be chosen for fusion.

Although a preferred embodiment for the method and apparatus of the present invention has been illustrated in the accompanying Drawings and described in the foregoing Detailed Description, it will be appreciated by those skilled in the art that various modifications and rearrangements of the elements and steps of the apparatus and method of the present invention may be made without departing from the scope of the invention. In particular, it will be understood that the method and apparatus of the present invention are not limited to processing target location and classification data dimensions, but may process any number of corresponding data dimensions output by sensor processors (step 62c).

I claim:

1. A method for correlating first target data having at least one dimension generated by an electromagnetic sensor with second target data having at least one corresponding dimension generated by an optical sensor, comprising the steps of:

generating a Figure of merit in each corresponding dimension related to the accuracy of a match between the first and second target data in the corresponding dimension; and combining the Figures of merit generated from the corresponding dimensions to output a measure of correlation between the first target data and second target data indicative of the likelihood that the target detected by the electromagnetic sensor and the target detected by the optical sensor are the same target.

2. The method as in claim 1 wherein the target data from the electromagnetic and optical sensors includes a corresponding dimension comprising target location data.

3. The method as in claim 2 wherein the step of generating comprises the steps of:

calculating the distance between the location of the target detected by the electromagnetic sensor and the location of the target detected by the optical sensor; and normalizing the calculated distance according to an error ellipse defined about one of the detected targets.

4. The method as in claim 1 wherein the target data from the electromagnetic and optical sensors includes a corresponding dimension comprising target classification data.

5. The method as in claim 4 wherein the step of generating comprises the step of assigning a quantitative value to the Figure of merit indicative of the likelihood that a target having the sensed classification of the target detected by the electromagnetic sensor would be co-located with a target having the sensed classification of the target detected by the optical sensor.

6. The method as in claim 4 wherein the target classification data comprises:
   target category data from the optical sensor; and
   emitter type data from the electromagnetic sensor.

7. The method as in claim 1 wherein the step of generating comprises the steps of:
   processing target classification data output for the detected targets in a first corresponding dimension to output a categorical Figure of merit indicative of the likelihood that a target having the classification of the target detected by the electromagnetic sensor and a target having the classification of the target detected by the optical sensor would be co-located; and
   processing target location data output for the detected targets in a second corresponding dimension to output a missed distance Figure of merit indicative of the normalized distance between the detected targets.

8. The method as in claim 7 wherein the step of combining comprises the step of multiplying a value derived from the categorical Figure of merit by a value derived from the missed distance Figure of merit to generate an output value indicative of the measure of correlation between the target data for the detected targets.

9. The method as in claim 1 further including the steps of:
   performing the steps of generating and combining with respect to a plurality of targets detected by the optical sensor;
   ranking the generated measures of correlation between the target detected by the electromagnetic sensor and each of the plurality of targets detected by the optical sensor; and
   comparing the ranked measures of correlation to a threshold value to identify those targets detected by the optical sensor for fusion that are most highly correlated with the target detected by the electromagnetic sensor.

10. A system for correlating target data having at least one dimension obtained from an electromagnetic sensor with target data having at least one corresponding dimension obtained from an optical sensor, comprising:
    means for generating a Figure of merit value in each corresponding dimension indicative of the accuracy of a match between the first and second target data in the corresponding dimension; and
    means for combining the Figure of merit values generated from the corresponding dimensions to generate a measure of correlation value indicative of the likelihood that the target detected by the electromagnetic sensor and the target detected by the optical sensor are the same target.

11. The system as in claim 10 wherein the target data from the electromagnetic and optical sensors includes a first dimension comprising target location data and a second dimension comprising target classification data, the means for generating including:
    means for generating a Figure of merit value based on a comparison of the target classification data for the detected targets; and
    means for generating a Figure of merit value based on the distance between the locations of the detected targets.

12. The system as in claim 11 wherein the means for generating a Figure of merit value bases on target classification data comprises means for assigning a quantitative value indicative of the likelihood that a target having the sensed classification of the target detected by the electromagnetic sensor and a target having the sensed classification of the target detected by the optical sensor would be co-located.

13. The system as in claim 11 wherein the means for generating the Figure of merit value based on distance comprises:
    means for calculating the distance between the location of the detected targets; and
    means for normalizing the calculated distance according to an error ellipse defined about the target detected by one of the sensors.

14. The system as in claim 10 wherein the means for combining comprises means for mathematically combining the generated Figure of merit values in the corresponding dimensions to generate the measure of correlation value.

15. A method for correlating corresponding target location data and corresponding classification data generated for a plurality of targets, comprising the steps of:
    identifying an emitter type classification of a first target;
    identifying an optical category classification of a second target;
    comparing the target classification data to derive a categorical Figure of merit indicative of a match between the classification of the first target and the classification of the second target;
    processing the target location data to derive a missed distance Figure of merit indicative of a match in location between the first target and the second target; and
    processing the categorical Figure of merit and the missed distance Figure of merit to generate a measure of correlation output indicative of the likelihood that the first target and the second target are the same target.

16. The method as in claim 15 wherein the step of processing the target location data includes the steps of:
    calculating the distance between the location of the first target and the location of the second target;
    defining an error ellipse having a predetermined orientation and shape around the first target;
    normalizing the calculated distance between the second target and the first target in accordance with the error ellipse to generate a value for the missed distance Figure of merit.

17. The method as in claim 15 further comprising the steps of:
    ranking the output measure of correlation for the first target and the second target; and
    comparing the output measures of correlation to a threshold value to identify whether or not the second target should be fused with the first target.

18. The method as in claim 15 wherein the step of processing the categorical Figure of merit and the missed distance Figure of merit comprises the step of multiplying a value derived from the missed distance Figure of merit by a value derived from the categorical Figure of merit to generate the measure of correlation output.

19. The method as in claim 18 wherein the value derived from the categorical Figure of merit comprises the categorical Figure of merit subtracted from an integer value.

20. A method for correlating corresponding dimensions of target data provided for a plurality of detected targets by an electromagnetic sensor and an optical sensor, comprising the steps of:
   (a) selecting one of the plurality of targets detected by either the electromagnetic or optical sensor as a subject target;
   (b) identifying as candidate targets each of the remaining plurality of targets detected by the sensor not detecting the selected subject target;
   (c) processing each corresponding dimension of target data to generate a Figure of merit between the subject target and each of the candidate targets, each Figure of merit indicative of a match between a corresponding dimension of target data for the subject target and the candidate target;
   (d) mathematically combining the Figures of merit generated for the subject target and each of the candidate targets to derive a measure of correlation between the subject target data and candidate target data, each measure of correlation indicative of the likelihood that the subject target and the candidate target are the same target;
   (e) ranking the derived measures of correlation; and
   (f) comparing the ranked measures of correlation to a threshold to identify those candidate targets that are the most likely candidates for fusion with the subject target.

21. The method as in claim 20 further including the steps of:
   (g) selecting another one of the plurality of targets detected by either the electromagnetic or optical sensor as the subject target; and
   (h) repeating steps (b) through (f) to determine the values for the measures of correlation between the newly selected subject target and each of the candidate targets.

22. The method as in claim 21 further including the step of:
   (i) repeating steps (g) and (h) until each of the plurality of targets has been evaluated as the subject target.

23. A method for correlating corresponding target location data and corresponding classification data generated for a subject target and a candidate target, comprising the steps of:
   processing the target classification data to derive a categorical Figure of merit indicative of a match between the classification of the subject target and the classification of the candidate target;
   processing the target location data to derive a missed distance Figure of merit indicative of a match in location between the subject target and the candidate target; and
   multiplying a value derived from the missed distance Figure of merit by a value representing the categorical Figure of merit subtracted from an integer value to generate a measure of correlation output indicative of the likelihood that the subject target and the candidate target are the same target.

* * * * *

UNITED STATES PATENT AND TRADEMARK OFFICE
CERTIFICATE OF CORRECTION

PATENT NO. : 5,392,225
DATED : February 21, 1995
INVENTOR(S) : Anne Marie D. Ward It is certified that error appears in the above-indentified patent and that said Letters Patent is hereby corrected as shown below: Title page:

Item: [73] Assignee, "E-Sytems", should be --E-Systems--.
Col. 3, line 17, "of-the", should be --of the--.

Signed and Sealed this

Tenth Day of October, 1995

Attest:

BRUCE LEHMAN

Attesting Officer    Commissioner of Patents and Trademarks